United States Patent [19]
DeWitt

[11] Patent Number: 5,201,836
[45] Date of Patent: Apr. 13, 1993

[54] AUTOMATIC TRAILER STEERING MECHANISM

[76] Inventor: Nicklas R. DeWitt, 7550 Travois Trail, Carefree, Ariz. 85377

[21] Appl. No.: 851,697

[22] Filed: Mar. 13, 1992

[51] Int. Cl.$^5$ ............................................. B62D 53/06
[52] U.S. Cl. ..................................... 280/426; 280/442
[58] Field of Search ................. 280/98, 114, 130, 426, 280/442

[56] References Cited

U.S. PATENT DOCUMENTS

| | | | |
|---|---|---|---|
| 2,286,166 | 6/1942 | Carmody | 280/426 |
| 2,359,978 | 10/1944 | Edwards | 280/426 |
| 2,793,052 | 5/1957 | Googe | 280/426 |
| 2,797,106 | 6/1957 | Lorr | 280/426 |
| 2,959,428 | 11/1960 | Felburn | 280/426 |
| 3,168,332 | 2/1965 | Eynon | 280/423.1 |
| 4,441,730 | 4/1984 | Damm | 280/426 |
| 4,660,848 | 4/1987 | DeWitt | 280/404 |
| 4,720,118 | 1/1988 | Schultz et al. | 280/432 |
| 4,982,976 | 1/1991 | Kramer | 280/426 |

Primary Examiner—Russell D. Stormer
Assistant Examiner—Andrew C. Pike
Attorney, Agent, or Firm—LaValle D. Ptak

[57] ABSTRACT

A steering mechanism is used to turn the rear wheels of a trailer towed by a tractor with a fifth wheel hitch between the tractor and the trailer. The trailer has a steering control mechanism mounted at its forward end. This mechanism is coupled with the fifth wheel of the tractor to translate rotational motion between the front end of the trailer and the tractor fifth wheel to rotate a frame. The rear wheels of the trailer are mounted on the frame, which imparts steering of the rear of the trailer complementary to the direction in which the tractor trailer rig is turned. A provision is made to limit the number of degrees of pivot, which is imparted to the rear wheels of the trailer, to a maximum amount when the rotation between the tractor fifth wheel and the front of the trailer exceeds a pre-established angular amount. This limitation is effected mechanically through a Geneva gear assembly, which forms part of the steering control mechanism.

15 Claims, 4 Drawing Sheets

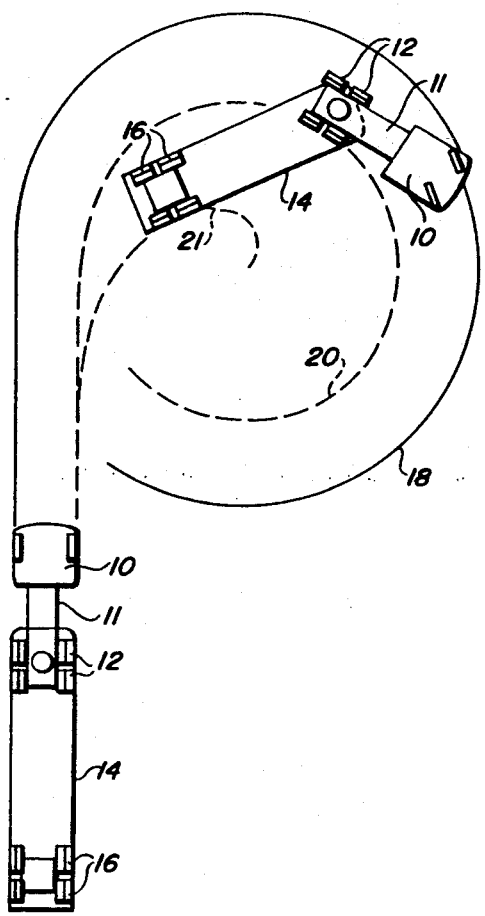
FIG. 1
(PRIOR ART)
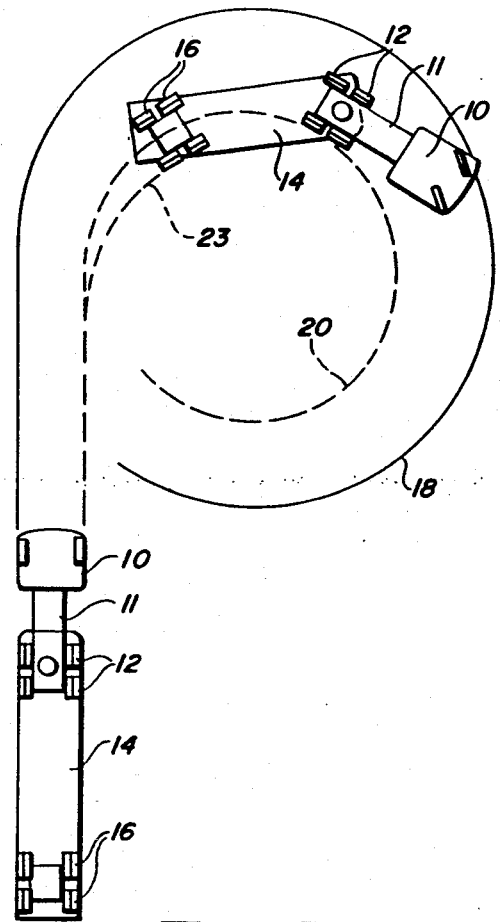
FIG. 2
FIG. 3
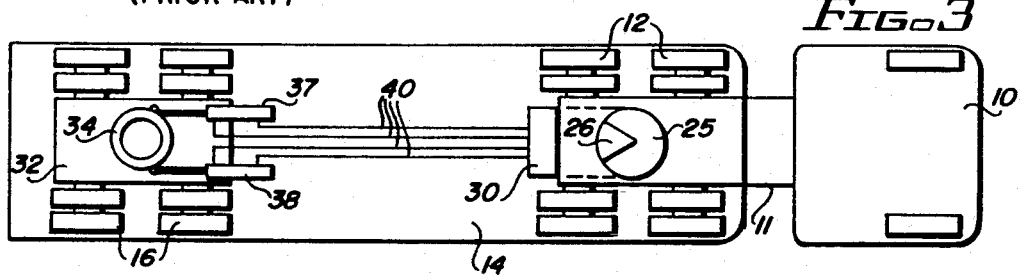
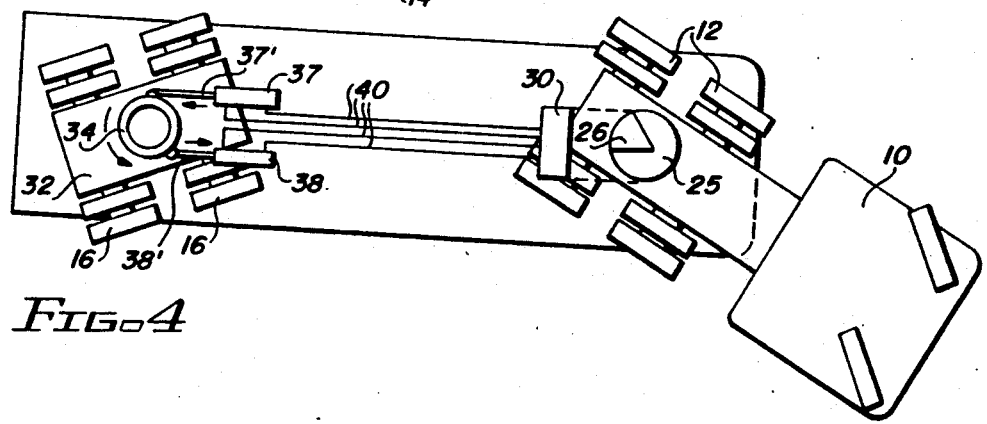
FIG. 4

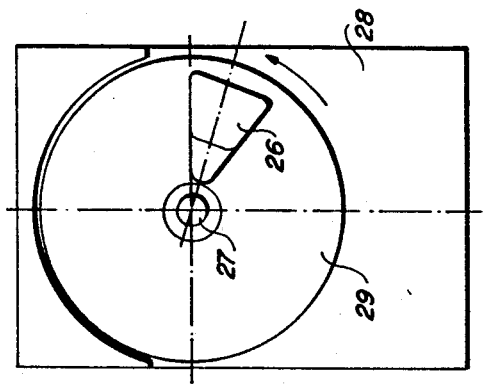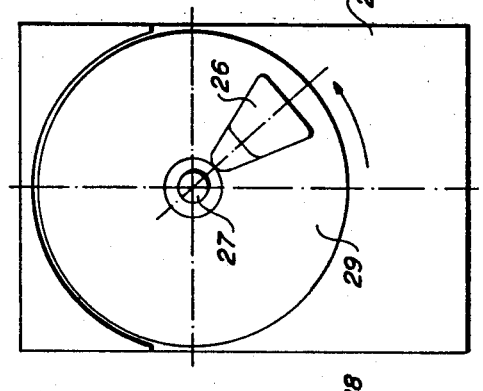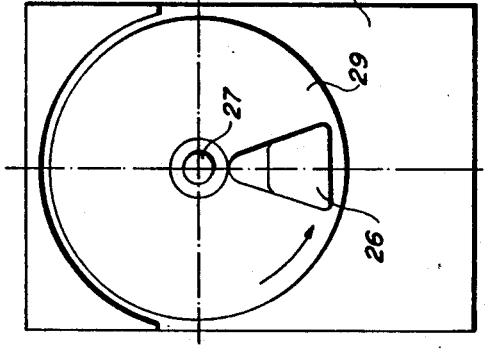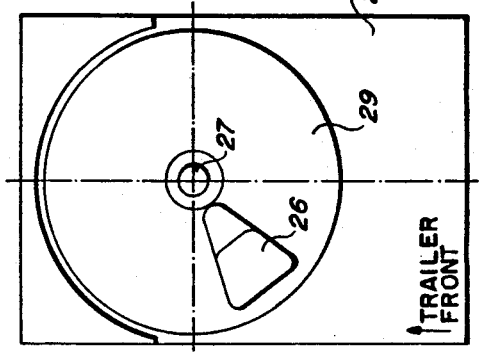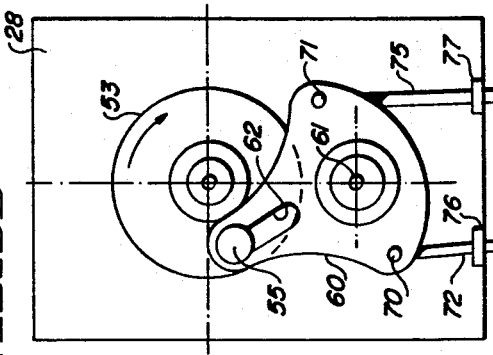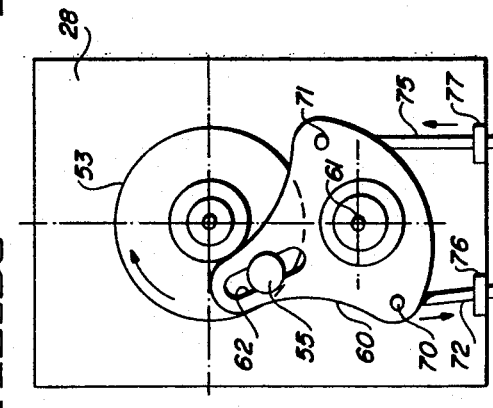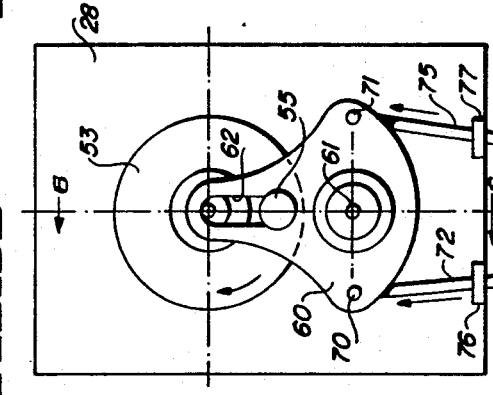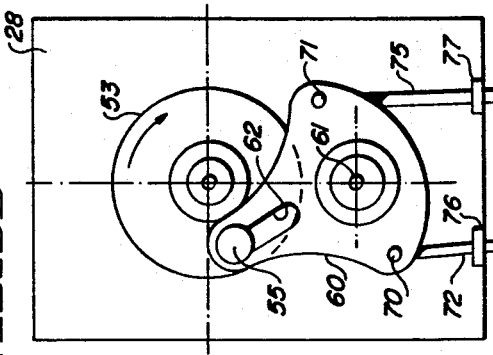

AUTOMATIC TRAILER STEERING MECHANISM

BACKGROUND

Tractor-semi-trailer combinations are extensively used in the trucking industry to transport goods over the nation's highways. Semi-trailers having a trailer length of 40' are quite common. In addition, proposals have been made to permit the use of trailers even exceeding this length When such long tractor-trailer combinations are used on limited access interstate highways, no particularly significant problems are encountered, since the lanes are wide, and the curves are large radius curves. When the tractor-trailer combination, particularly for such long trailers, is operated on city streets, however, the relatively narrow width of many streets makes it very difficult or impossible to maneuver the tractor-trailer through turns from one street onto a cross do not track the tractor, but tend to be considerably offset, particularly in sharp turns, as the tractor maneuvers through a turn. The result is that trailer lengths considerably shorter than those which are permitted for use in over-highway travel must be employed for inner city travel. As a consequence, transferring of cargo from large trailers to smaller ones for delivery in many areas is necessary, resulting in significantly increased labor costs, as well as the potential for increased loss or damage to the cargos being hauled.

Efforts have been made to provide for controlled or automatic steering of the rear wheels of a tractor-semi-trailer combination to reduce the amount of offset between the rear of the trailer and the tractor during turns, particularly relatively sharp right-angle turns of the type encountered in city streets. One such device is disclosed in the patent to DeWitt. U.S. Pat. No. 4,660,848. The device disclosed in this patent is a telescoping articulating stinger for hauling large shipping containers. When the tractor towing the stinger/trailer encounters sharp turns, an articulated joint operates to steer the rear wheel set to cause the rear of the stinger/-trailer to more nearly track the path of the tractor. This device, however, requires clearance for movement of the stinger beneath the container, along with a provision to lock the articulated portion in a straight line when the steering of the rear wheels of the stinger/-trailer is not desired.

Another approach to turning the rear wheels of a trailer, in response to the relative movement between the tractor and the trailer at the, fifth wheel connection, is disclosed in the patent to Googe U.S. Pat. No. 2,793,052. The steering mechanism of this patent effectively requires three fifth wheel type of units. A coupling between the fifth wheel linkage of the trailer to the tractor operates a second fifth wheel plate, located rearwardly of the tractor/trailer fifth wheel. Rotational movement of this second fifth wheel mechanism then is applied to additional mechanism for rotating or steering the rear trailer wheels. The multiple fifth wheel mechanisms, used in the device of this patent however, can result in lost motion; and it is possible for the tractor to cut under the device, possibly damaging it. The device of Googe includes an additional provision to permit it to be disconnected for operation of the trailer in a normal fixed-wheel mode.

Another approach for steering the rear wheels of a trailer is disclosed in the patent to Carmody, U.S. Pat. No. 2,286,166. This patent provides a slot at the fifth wheel, which guides a pin attached to one end of an elongated pivoted lever. The lever is pivoted on the trailer at a location spaced from the fifth wheel position toward the trailer. The opposite end of the lever operates a rack and pinion gear to rotate a steering shaft, which is used to effect steering of the rear wheels of the trailer. This is a rather cumbersome apparatus; and because the rack and pinion steering gear must be located beneath the trailer, dirt and debris thrown up from the road by the rear wheels of the tractor, and impacting on the rack and pinion mechanism, can have a highly deleterious effect on its operation.

Three other patents, to Edwards, U.S. Pat. No. 2,359,978; Lorr, U.S. Pat. No. 2,797,106; and Felburn, U.S. Pat. No. 2,959,428, all disclose direct mechanical linkage between a rotating fifth wheel plate and steering apparatus attached to the rear wheels of a trailer. As the amount of relative rotation between the fifth wheel and the front of the trailer is increased, the steering of the rear wheels of the trailer correspondingly is increased.

It is desirable to provide a steering system for the rear wheels of a semi-trailer which is automatic in operation, overcomes the disadvantages of the prior art, is simple to operate, and which automatically limits the amount of pivotal rotation or steering imparted to the rear wheels of the trailer once the relative rotation between the fifth wheel of the tractor and the front of the trailer exceeds a pre-established angular amount.

SUMMARY OF THE INVENTION

It is an object of this invention to provide an improved mechanism for steering the rear wheels of a trailer in a tractor-trailer vehicle combination.

It is another object of this invention to provide an improved steering mechanism for the rear wheels of a tractor-trailer combination, which automatically corresponds to the relative rotation between the fifth wheel on the tractor and the front of the trailer.

It is a further object of this invention to provide an actuated by the relative movement of the towing tractor fifth wheel and the mount for the trailer on that fifth wheel, with a provision for limiting the maximum pivot or turning of the rear wheels of the trailer.

In accordance with a preferred embodiment of this invention, a steering mechanism for a trailer towed by a tractor having a fifth wheel member includes a support plate, which is mounted on the forward end of the trailer. A kingpin is mounted on the support plate for engagement with the fifth wheel member of a tractor. A first rotating plate is mounted concentrically about the kingpin for rotation relative to the support plate; and the first rotating plate is releasably locked to the fifth wheel member when the trailer is being towed by the tractor. The rear of the trailer includes a pair of steerable wheels attached to an axle on a frame pivotally mounted under the trailer. A steering control means then is coupled with the first rotating plate, and with the pivotally mounted frame, for effecting a pivoting or steering of the steerable wheels under the control of the rotational movement of the first rotating plate with respect to the support plate.

BRIEF DESCRIPTION OF THE DRAWINGS

FIG. 1 is a diagrammatic representation of the turning radii of different portions of a standard tractor-semi-trailer combination;

FIG. 2 is a diagrammatic representation of the turning radii of different portions of a tractor-semi-trailer combination incorporating a preferred embodiment of the invention;

FIGS. 3 and 4 are diagrammatic representations of a preferred embodiment of the invention in different operating modes;

FIGS. 9A through 9D are bottom views of the preferred embodiment of the invention at four different operating positions thereof; and FIGS. 10A through 10D are top views of the preferred embodiment of the invention, corresponding with the operating positions of the bottom views of FIGS. 9A through 9D, respectively.

DETAILED DESCRIPTION

Figure 5:
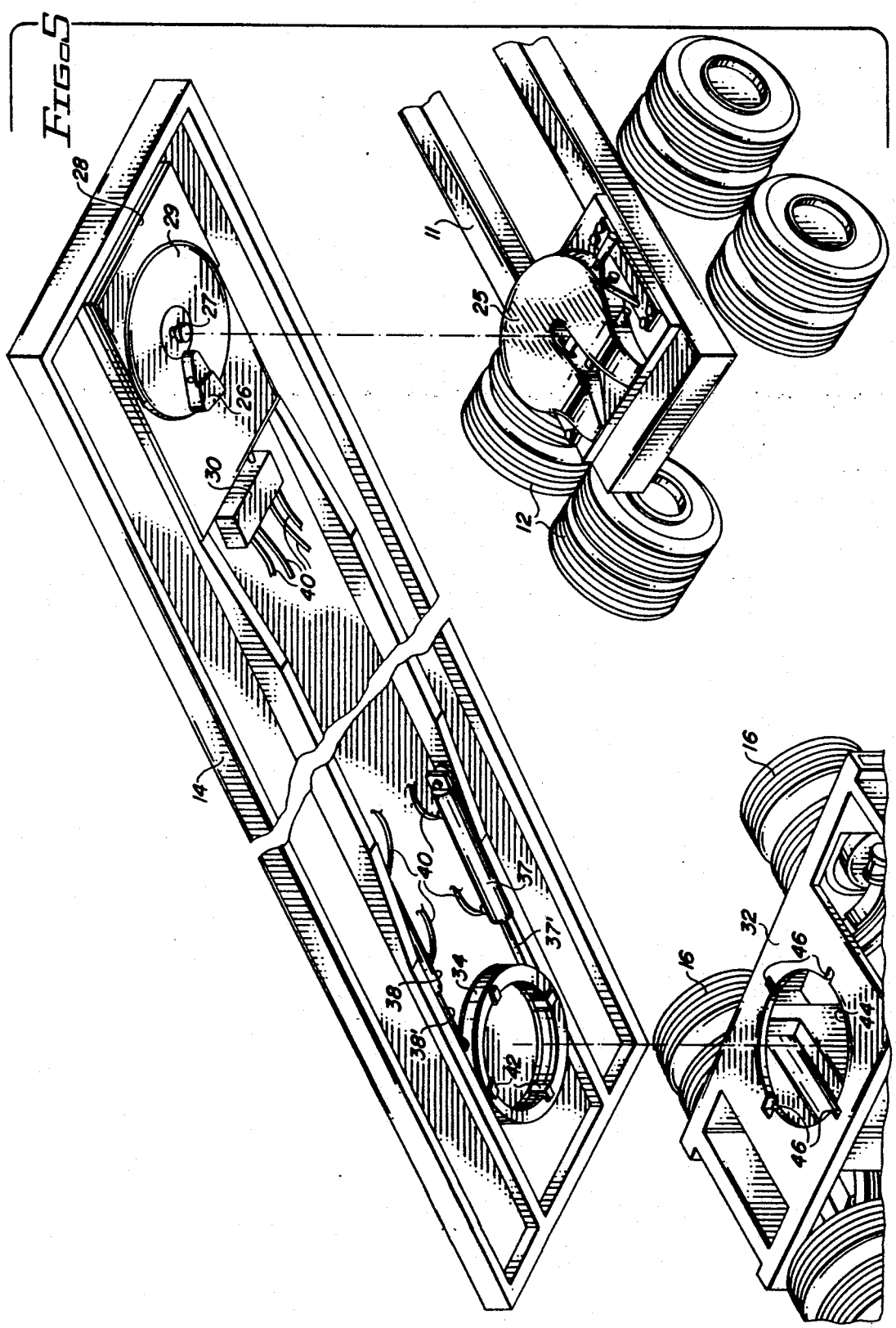
FIG. 5 is an exploded view of a preferred embodiment of the invention.

Reference now should be made to the drawings, in which the same reference numbers are used throughout the different figures to designate the same or similar components. FIG. 1 is a diagrammatic prior art representation of a tractor-semi-trailer combination, including a tractor 10 with a cab, a chassis 11, and tandem rear drive wheels 12. Mounted over the drive wheels 12 is a standard fifth wheel for attachment to a semi-trailer 14, which carries a pair of tandem wheels 16 at its rear end. FIG. 1 diagrammatically shows the path followed by the outer front steering wheel of the tractor 10 as it begins and completes a minimum diameter turn. This path is indicated by the circle 18. The inside rear wheels of the tractor follow the dotted line path 20, while the inside rear wheels 16 of the trailer 14 follow the dotted line path 21. As is readily apparent from an examination of FIG. 1, the rear of the trailer 14, in such a turn, is significantly offset from the path followed by the front wheels of the tractor 10. In addition, as the tractor 10 moves beyond the point shown in solid lines at the top of the turn of FIG. 1, the rear wheels 16 of the trailer 14 drag or skid sideways, as is well known. The result of this substantial offset is a significant limitation in the width of city streets which may be traversed by a tractor-trailer combination, since the streets must be wide enough to accommodate the offset between the curve 18 and the curve 21, shown in FIG. 1.

FIG. 2 is a diagrammatic representation of a similar tractor-trailer combination, of the type shown in FIG. 1, but incorporating steerable rear wheels 16 on the trailer 14 to significantly reduce the amount of offset between the path followed by the inside rear wheels of the trailer 16, and identified by the dotted line 23 of FIG. 2, contrasted with the offset path 21 of non-steerable rear wheels indicated in FIG. 1. It is readily apparent from a comparison of the diagrams of FIGS. 1 and 2, that the tractor-trailer combination of FIG. 2 is able to maneuver over much narrower streets than the combination of FIG. 1.

FIGS. 3 and 4 are diagrammatic top views of a preferred embodiment of the invention. These figures illustrate the operative interconnections between a steering control mechanism activated by the relative rotational position of the fifth wheel 25 of the tractor 10 and the forward end of the trailer. The control mechanism is activated by a wedge 26, which fits into the generally V-shaped opening at the rear of a standard fifth wheel 25. The wedge 26 is connected to apparatus, not shown in FIGS. 3 and 4, to operate a steering control hydraulic system 30 (either liquid or air), which is interconnected by control lines 40 to fluid or air hydraulic cylinders 37 and 38, operating in a push-pull manner to rotate a pivotal mounting 34 on a frame or bolster 32. The frame 32 carries the axles for the rear wheels 16 of the trailer. FIG. 3 illustrates the assembly in a straight-ahead position; and FIG. 4 illustrates the assembly with the tractor in a turn, showing the relative position of the pivoting frame or bolster 32 with respect to the turn being undertaken by the tractor-trailer combination.

FIG. 5 is a partially-exploded perspective view illustrating some of the details of the apparatus diagrammatically shown in FIGS. 3 and 4. The upper portion of FIG. 5 shows the underside of the chassis of the trailer 14, illustrating mechanisms attached end, a kingpin 27 of a conventional type is attached to a support plate 28, which, in turn, is secured in any suitable fashion between a pair of parallel elongated support rails beneath the bed of the trailer 14. A pivotal or rotating support plate 29 is attached for rotation about the kingpin 27, and for relative rotation with respect to the support plate 28.

The lower surface of the rotating plate 29 has a wedge-shaped projection 26 on it configured to seat within the wedge-shaped opening or dovetail slot at the rear of the fifth wheel 25. When the kingpin 27 is locked in place on the fifth wheel 25, the wedge 26 is located to the rear of the kingpin 27 in the dovetail of the fifth wheel 25. The wedge 26 also may be independently locked by means of a pin passing through the fifth wheel 25 and a hole through the wedge 26. Consequently, when the trailer 14 is attached to the fifth wheel 25 for towing by the tractor 10/11, the plate 29 is held in a fixed position relative to the fifth wheel 25; but the trailer 14 and the plate 28, which is attached to it, is free to rotate about the rotating plate 29 and kingpin 27.

This relative rotation between these parts is diagrammatically illustrated in the bottom views of the plate 28, plate 29 and wedge 26 in FIGS. 9A through 9D, which illustrate the relative positions of these components for a left turn, straight ahead, shallow right turn and hard right turn, respectively. The manner, in which this relative movement between the plates 28 and 29 is utilized to effect steering control of the frame or bolster 32 carrying the rear wheels 16 on axles attached to the frame 32, is 10.

Continuing reference to FIG. 5, however, the underside of the trailer 14 includes a circular ring 34 pivotally attached under the rear of the frame of the trailer 14, and including four projections 42. The projections 42 are designed to fit within or to be inserted into corresponding slots 46 around the periphery of a circular opening 44 in the top of the frame 32, which carries the rear axles for the wheels 16 of the trailer. Attachment of the projections 42 in the slots 46 may be effected in any conventional desired manner. The ring 34, on which the projections 42 are mounted, rotates about ball bearings freely in either direction.

Control of the rotation of the member 34, and therefore the position of the frame or bolster 32, is effected by means of a pair of air or hydraulic cylinders 37 and 38 mounted on opposite sides of the underside of the frame of the trailer 14. Operating rods 37' and 38' are attached to the pistons of the cylinders 37 and 38 attached in a push-pull fashion on opposite sides of the ring 34. The pistons (and therefore the operating rods) are extended to exactly the same distance by the hydraulic or air cylinders 37 and 38 when the trailer 14 is being pulled straight ahead. When the tractor turns to the right, the frame or bolster 32 is turned in the opposite direction (as shown in FIGS. 2 and 4) by the push-pull actuation of the respective operating rods 37' and 38'. The control lines 40 for effecting this operation extend from a valve control box 30, as shown in FIG. 5.

Reference now should be made to FIGS. 6, 7, 9, and 10 for a more detailed understanding of the mechanism, and the operation which has been described thus far.

Figure 6:
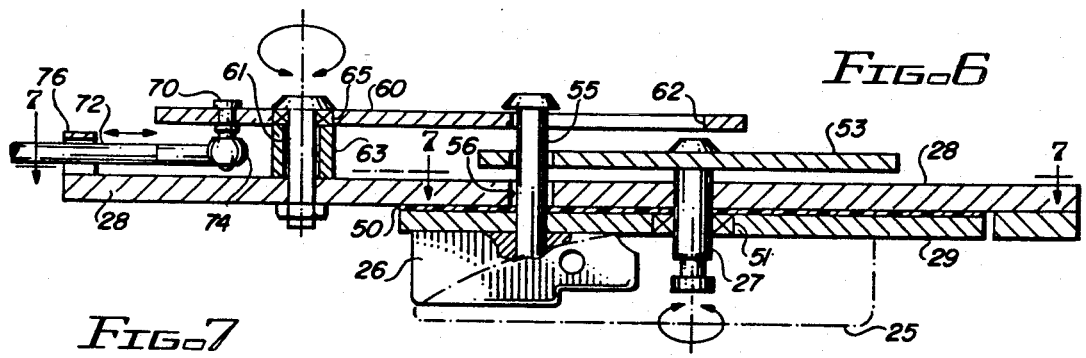
FIG. 6 is a cross-sectional view taken along line 6—6 of FIG. 10B of a preferred embodiment of the invention.
Figure 7:
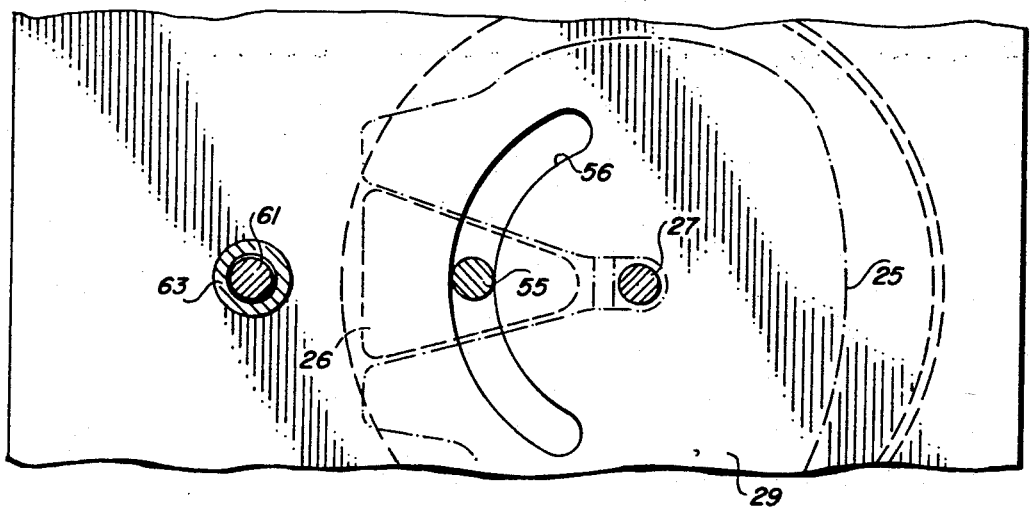
FIG. 7 is a cross-sectional view taken along the line 7—7 of FIG. 6.

FIG. 6 is a cross-sectional view of the mechanism attached to the plate 28, described above in conjunction with FIG. 5. As is apparent from an examination of FIG. 6, the rotating plate 29 is rotatably attached to the kingpin 27 by means of a bearing 51. A polyethylene slide disk 50, or its equivalent, is place between the upper surface of the rotating plate 29 and the support plate 28 to provide a low friction greaseless bearing surface between the plate 29 and the plate 28. Since there is no relative rotation between the plate 29 and the top of the fifth wheel 25, the fifth wheel 25 does not need to be greased, or needs to have only minimal grease on it, since no rotating forces take place on the surface of the fifth wheel 25 on the tractor.

Also, as indicated in FIG. 6, the wedge 26 is attached to the underside of the plate 29 for engagement with and to fit into the dovetail of the fifth wheel 25, as described previously. A pin 55 extends upwardly from the wedge 26 through the plate 29, and through an arcuate aperture 56 (most clearly shown in FIG. 7) and through another circular plate 53 concentrically mounted about the extension of the kingpin 27 on the opposite side of the support plate 28. This pin 55 extends upwardly through an elongated slot 62 in the surface of a bell-shaped "Geneva" lever 60 (shown most clearly in FIGS. 10A through 10D). Thus, when there is relative rotation between the rotating plate 29 and the support plate 28, the pin 55 moves in the arcuate path defined by the slot 56, with the ends of the slot 56 constituting the extent of travel which can take place between the fifth wheel 25 and the trailer 14 being towed by the tractor 10.

The bell-shaped pivotal lever 60 is mounted on a pivot 61 by means of a bearing 65; and the lever 60 is spaced upwardly from the plate 28 by means of a suitable bearing spacer 63, to place it in the relative position shown in FIG. 6, overlying the other components of the steering control mechanism. The pivot 61 is located in a straight line behind the kingpin 27, along the centerline of the tractor-trailer combination (when the tractor and trailer are moving straight ahead). A typical distance is approximately two feet between the kingpin 27 and the location of the pivot 61. When the tractor-trailer is moving straight ahead, the various components described above are aligned as illustrated in FIGS. 7, 9B, and 10B.

In alignment with the centerline of the pivot 61, and on a line which is transverse to the longitudinal line of the tractor-trailer combination when it is moving straight ahead, are a pair of additional pivot connections 70 and 71 (illustrated most clearly in FIGS. 6 and 10). These pivots carry at 74 a pair of operating arms 72 and 75, respectively, which are mounted in bushings 76 and 77, for movement in a push-pull manner, as illustrated in FIGS. 10A through 10D, to translate the relative rotational movement between the plate 29 and the support plate 28 into a reciprocating movement for use in controlling the steering or pivotal operation of the frame 32 for the rear wheels of the trailer.

As is most readily apparent from an examination of FIGS. 10A through 10D (showing a top view of the apparatus), the bell-shaped lever 60, in conjunction with the pin 55 rotating with the plates 29 and 53, functions as a Geneva gear device. When the tractor-trailer rig is negotiating a left turn, the bottom view of the device showing the position of the wedge 26 and the top view of the device showing the position of the bell-shaped member 60, are as illustrated in FIGS. 9A (viewed from the bottom) and 10A (viewed from the top), respectively. The pin 55 moves longitudinally in the slot 62 as it is moved through the arcuate slot 56 as the trailer is turned. As is readily apparent from an examination of FIG. 10A, the operating lever or rod 72 is pulled toward the front of the trailer, while the rod 75 is pushed toward the rear of the trailer by the same amount.

In FIGS. 9B and 10B, the positions of the various components, for movement of the tractor-trailer unit a straight ahead direction, is illustrated. In this position, the pin 55 is seated near the bottom or rearward end of the slot 62, the bell lever 60 is aligned with the kingpin 27, and the attachment pivots 70 and 71 for the operating rods 72 and 75 are at equal distances from the rear of the plate 28. In this configuration, the operating rods 72 and 75 are extended by exactly the same amounts.

FIGS. 9C/10C and 9D/10D illustrate operation of the unit when the tractor-trailer is turned to the right. In FIGS. 9C (viewed from the bottom) and 10C (viewed from the top), the turn is an intermediate turn causing approximately a 45° relative rotation between the fifth wheel of the tractor and the plate 28, and, therefore, the same amount of relative rotation between the plate 29 and the plate 28. When this occurs, the plates 29 and 53 rotate as indicated in FIG. 10C to place the pin 55 approximately midway in the slot 62 on the lever 60, causing it to tilt toward the left, as indicated in FIG. 10C. This pushes the rod or lever toward the rear of the trailer and pulls the rod 75 toward the front of the trailer in the amount indicated in FIG. 10C.

Further turning of the tractor-trailer to the right, to the "hard right" position, shown in FIGS. 9D (viewed from the bottom) and 10D (viewed from the top), causes the rotational positions of the fifth wheel 25/rotating plate 29 relative to the plate 28 to reach the position shown in FIG. 9D. This, however, does not result in any further tilting or rotation of the bell lever 60 about the pivot 61, but does cause the pin 55 to move toward the forward end of the slot 62, as illustrated in FIG. 10D.

The operating rods 72 and 75 do not move from the position shown in FIG. 10C during this additional amount of turning; so that, as translated to the controls for pivoting of the frame 32 on which the rear wheels 16 of the trailer are mounted, no additional turning of those rear wheels beyond that which was effected from the position in FIG. 10C is caused. This is an important feature of the mechanism, since it prevents the trailer wheels 16 from being pivoted to a position at or close to 90° with respect to the longitudinal axis of the trailer, even through such a relative position between the fifth wheel of the tractor and the front end of the trailer is possible. If this limitation were not provided, it would be possible to cause the trailer and tractor to reach a position where movement would be difficult or impossible, particularly when the tractor-trailer is moving backward or in the reverse direction. By limiting the amount of the pivot of the rear wheels of the trailer to something like 22° at a maximum, irrespective of the amount of relative rotation between the tractor and the front of the trailer, such an undesirable lock-up is prevented.

The amount of relative rotation between the fifth wheel and the front of the trailer, which is translated to the pivoting or turning of the back wheels of the trailer by imparting rotational movement to the frame 32, is controlled by the distance the pivot 61 is located behind the kingpin 27. The farther back the pivot 61 for the lever 60 is located, the more turn there is of the back wheels of the trailer. Consequently, the maximum turning or pivoting of the back wheels is established by the choice of position of the pivot 61 for the lever 60. Obviously, longer or shorter slots 62 are required for the end of the lever which overlies the slot 56 for different positions of the lever 60. As mentioned above, a typical distance, which is considered to be satisfactory for most applications, is to have the distance between the kingpin 27 and the pivot 61 approximately two feet.

Figure 8:
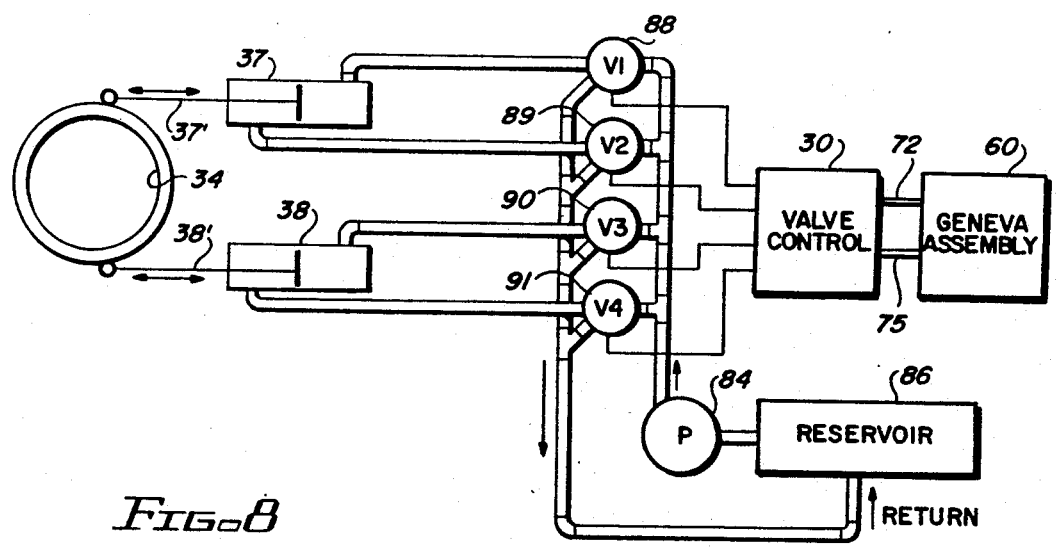
FIG. 8 is a diagrammatic representation of a portion of a control system used in conjunction with the preferred embodiment of the invention.

FIG. 8 illustrates a typical air or hydraulic control mechanism, which may be used to translate the operation of the Geneva assembly 60 (and illustrated in detail in FIGS. 10A through 10D) resulting in the reciprocating movement of the control rods 72 and 75 into air or hydraulic controls for rotating the member 34. As stated previously, rotation of the member 34 controls the rotational position of the frame 32, on which the axles for the rear wheels 16 of the trailer are mounted. The reciprocating motion of the levers 72 and 75 is applied to a conventional valve control mechanism 30, which translates this operation into the control of four valves (either located in a fluid hydraulic system or in an air system) 88, 89, 90, and 91. These valves, in turn, as illustrated, are connected to opposite ends of the pistons 37 and 38. In FIG. 8 a conventional pump 84 and reservoir 86 are illustrated for providing the desired hydraulic or air operation of the system. In addition to using air or hydraulic operation to rotate the ring 34, electric motors could also be employed, if desired.

As is readily apparent from an examination of FIG. 5, the primary components of the mechanism of this invention can be enclosed completely out of contact with road debris, rain, and the like, by the plate 28. The mechanism is located in the space between the plate 28 and the lower side of the floor of the trailer 14 by configuring the plate 28 to extend fully across the space between the longitudinal support frame members of the trailer 14. This means that the moving components of the device are not subject to damage by mud and dirt kicked up from the rear wheels 12 of the tractor. The overall mechanism is composed of a minimum a number of parts, and is simple to operate and maintain. It readily may be adapted as a retrofit mechanism for any trailer or it may be built into a new trailer, particularly long trailers, as standard equipment. The device also is such that no modification of the standard fifth wheel on the tractor is required; and since the operation of the device is fully automatic, no intervention by the operator of the tractor is necessary to achieve the desired results. Since the rotation of the trailer wheels is limited in the manner described above, the trailer easily may be moved in reverse to maneuver it to loading docks and the like, without any danger of causing the rear wheels of the trailer to be locked up at some sharp angle.

The foregoing description of the preferred embodiment of the invention is to be taken as illustrative of the invention, and not as limiting. Various changes and modifications will occur to those skilled in the art, without departing from the true scope of the invention as defined by the appended claims.

I claim:

1. A steering mechanism for a trailer towed by a tractor having a fifth wheel member, said steering mechanism including in combination:

a support plate for mounting on a forward end of the trailer;

a kingpin mounted on said support plate for engagement with the fifth wheel member of the tractor;

first rotating plate means rotatably mounted on said support plate for rotation about said kingpin;

means for releasably locking said first rotating plate means to the fifth wheel member of the tractor;

at least one pair of steerable wheels having an axle thereof attached to a frame pivotally mounted under said trailer, and spaced from the forward end thereof;

steering operating means coupled with said frame for said steerable wheels for pivoting said frame; and steering control means coupled with said first rotating plate means, and further coupled with said steering operating means for controlling the pivoting of said frame, said steering control means including limit means for limiting a maximum pivot of said frame when a relative rotation between said rotating plate means and said support plate reaches and exceeds a predetermined number of degrees of rotation.

2. The invention according to claim 1 wherein said steering control means further includes a second rotating plate means mounted for rotation on said support plate on a second pivot aligned with said kingpin rearwardly thereof, and rotated about said second pivot by a linkage with said first rotating plate means to rotate in response to the rotation of said first rotating plate means.

3. The invention according to claim 2 wherein said linkage causes said second rotating plate means to rotate in a direction opposite to a direction of the rotation of said first rotating plate means.

4. The invention according to claim 3 wherein said second rotating plate means comprises a Geneva gear member having a portion overlying said first rotating plate means, with an elongated slot therein, and said linkage interconnects said first rotating plate means with said elongated slot to rock said Geneva gear member about said second pivot in response to the rotation of said first rotating plate means.

5. The invention according to claim 4 wherein said kingpin, said second pivot, and said linkage are all aligned with one another when the trailer towed by the tractor is towed in a straight line, and wherein said slot in said second rotating means is an elongated slot longitudinally aligned with said kingpin and said second pivot when the tractor towing the trailer is moving in the straight line.

6. The invention according to claim 5 wherein said steering operating means includes a connecting lever pivotally mounted on said second rotating plate means at a position offset from a line passing through a center of said elongated slot.

7. The invention according to claim 6 wherein a length of said elongated slot and a distance between said kingpin and said second pivot establish said predetermined number of degrees of rotation, beyond which said steering control means ceases to exert further rotation of said frame on which said steerable wheels are mounted.

8. The invention according to claim 7 wherein said support plate includes an arcuate slot concentrically located about said kingpin between said kingpin and said second pivot, with said linkage attached for rotation with said first rotating plate means, and extending through said arcuate slot and said slot in said second rotating plate means.

9. The invention according to claim 8 wherein the fifth wheel member has a dovetail slot therein; said first rotating plate means is a circular plate means; and said means for releasably locking said first rotating plate means to the fifth wheel member comprises a wedge member attached to said first rotating plate means, and dimensioned to be seated between sides of the dovetail slot in the fifth wheel member when the trailer is towed by the tractor; so that said first rotating plate means maintains a fixed orientation with respect to the fifth wheel member during operation of the steering mechanism.

10. The invention according to claim 2 wherein said steering control means further includes a connecting lever mounted on said second rotating plate means, with said connecting lever being subjected to reciprocating motion as said second rotating plate means is rotated; and said lever is coupled with said steering operating means for operating said steering operating means.

11. The invention according to claim 2 wherein said second rotating plate means comprises a Geneva gear member having a portion overlying said first rotating plate means, with an elongated slot therein, and said linkage interconnects said first rotating plate means with said elongated slot to rock said Geneva gear member about said second pivot in response to the rotation of said first rotating plate means.

12. The invention according to claim 11 wherein said steering operating means includes a connecting lever pivotally mounted on said second rotating plate means at a position offset from a line passing through a center of said elongated slot.

13. The invention according to claim 1 wherein the fifth wheel member has a dovetail slot therein; said first rotating plate means is a circular plate means; and said means for releasably locking said first rotating plate means to the fifth wheel member comprises a wedge member attached to said first rotating plate means, and dimensioned to be seated between sides of the dovetail slot in the fifth wheel member when the trailer is towed by the tractor; so that said first rotating plate means maintains a fixed orientation with respect to the fifth wheel member during operation of the steering mechanism.

14. The invention according to claim 13 wherein said steering control means further includes a second rotating plate means mounted for rotation on said support plate on a second pivot aligned with said kingpin rearwardly thereof, and rotated about said second pivot by a linkage with said first rotating plate means to rotate in response to the rotation of said first rotating plate means.

15. The invention according to claim 14 wherein said support plate includes an arcuate slot concentrically located about said kingpin between said kingpin and said second pivot, with said linkage attached for rotation with said first rotating plate means, and extending through said arcuate slot and a slot in said second rotating plate means.

* * * * *